J. H. NORDIN.
FOOT STEERING ATTACHMENT FOR MOTOR CYCLES.
APPLICATION FILED MAY 25, 1914.
1,132,872.
Patented Mar. 23, 1915.
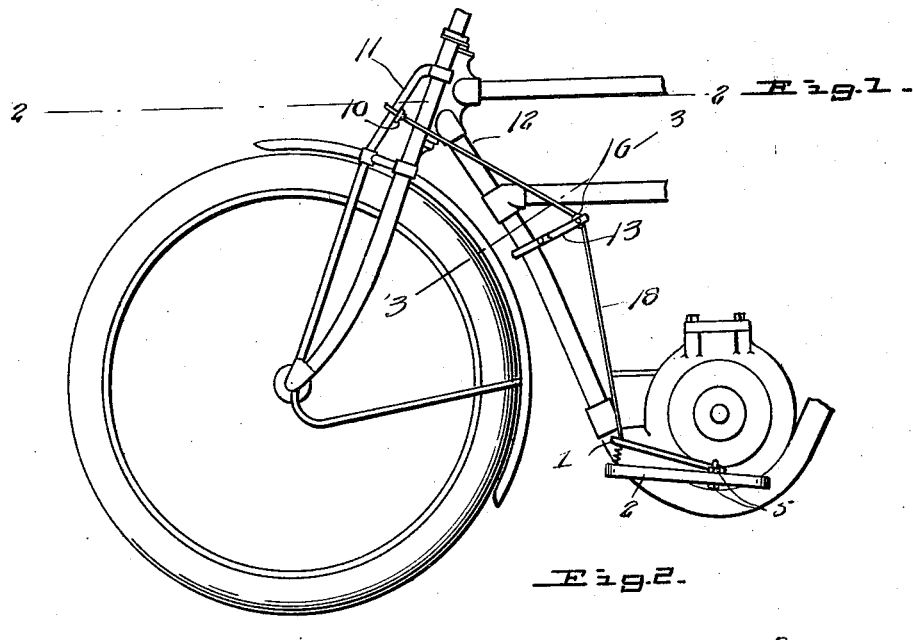
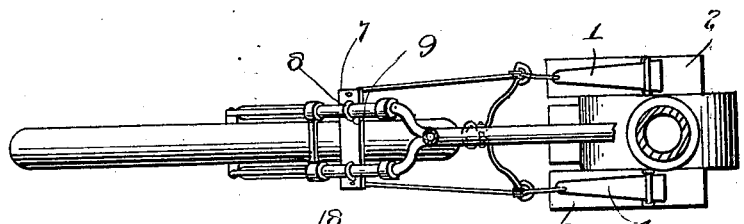
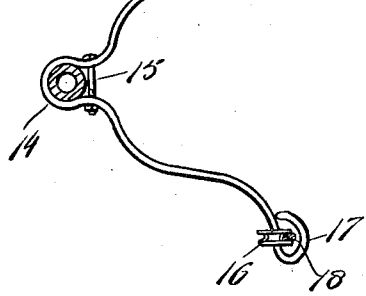
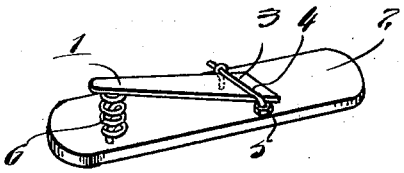
Inventor
J. H. Nordin.

UNITED STATES PATENT OFFICE.

JOHN HERMAN NORDIN, OF SOUTH SHORE, SOUTH DAKOTA.

FOOT STEERING ATTACHMENT FOR MOTOR-CYCLES.

1,132,872.    Specification of Letters Patent.    Patented Mar. 23, 1915.

Application filed May 25, 1914. Serial No. 840,931.

*To all whom it may concern:*

Be it known that I, JOHN H. NORDIN, a citizen of the United States, residing at South Shore, in the county of Codington, State of South Dakota, have invented certain new and useful Improvements in Foot Steering Attachments for Motor-Cycles; and I do hereby declare the following to be a full, clear, and exact description of the invention, such as will enable others skilled in the art to which it appertains to make and use the same.

This invention relates to a foot steering attachment for motorcycles.

An object of this invention is to provide means for steering motorcycles by the use of the feet so that the hands of the operator may be left free in order that he may use them for purposes other than steering.

A further object of this invention is to provide such steering means as will facilitate the work of a mail carrier or which will be of use in war so that the operator may have his hands free to use a gun or the like.

With these and other objects in view, this invention resides in the novel features of construction, formation, combination and arrangement of parts to be hereinafter more fully described, claimed and illustrated in the accompanying drawing, in which:

Figure 1 is a side elevation of my device attached to a motorcycle. Fig. 2 is a section on line 2—2 of Fig. 1. Fig. 3 is a section on line 3—3 of Fig. 1. Fig. 4 is an enlarged detail of the pedals.

Referring to the drawing by reference characters wherein like parts are indicated by like characters throughout the several views: My device comprises a pair of foot pedals 1 secured to the foot boards 2 of a motorcycle on each side of the machine. These pedals 1 are each pivotally attached to the said foot boards by a U-shaped bolt 3, which has a horizontal portion projecting across one end of the pedal and mounted in a groove 4 therein. These bolts 3 are secured to the foot boards by nuts 5 which are threaded upon the vertical portions of the bolts 3 and engage the upper and lower faces of the foot boards. In order to maintain the forward ends of these pedals 1 in a position spaced upwardly from the foot boards I have provided a spring 6 attached to the forward end of each of the foot pedals and to the forward end of each of the foot boards.

On the fork of the machine in the front part thereof is attached a cross bar 7 by hook members 8 which pass through apertures 9 in the member 7 and are secured therein by nuts 10 and the hook portions of which encircle the members 11 of the front fork and maintain the member 7 in rigid relationship therewith.

On the forward bar 12 of the machine between the ends thereof is secured a substantially U-shaped member 13 which has a loop 14 on the lower portion thereof which encircles the bar 12 and is held in place by the bolt 15. The arms of the U-shaped member extend upwardly and diverge and on the end of each is rotatably mounted a pulley 16. A guard member 17 is secured to the U-shaped member adjacent each pulley and extends thereover to prevent the controlling rope from jumping off of the pulley. Attached to each end of the bar 7 is a rope 18 which passes downwardly and backwardly upon the machine and over the pulley 16 and thence downwardly and is connected to the forward end of the foot pedal 1. It is to be understood that this rope on each side of the machine is always held taut so that the device will be ready for operation.

In operation assuming that the pedals 1 are in their operative position, that is with the forward end raised from the foot boards pressure is applied to one of the pedals which causes it to move about its pivot and to throw the forward end of it downwardly against the tension of the spring 6. This pulls the rope 18 which is attached to the particular pedal downwardly and by virtue of the connection of the rope to the fork of the machine through the bar 7 the front wheel is turned to the side on which the pedal is operated. However, when pressure is relieved from the particular pedal the spring 6 pushes the forward end upwardly and inasumch as the spring on the opposite side has been extended during the operation of the pedal the front wheel is turned to its initial position, that is in a plane of the rear wheel.

From the foregoing description it may be seen that I have provided means for steering a motorcycle by the use of the feet of the operator so that his hands will be free to be used for other purposes than to steer the machine.

While I have described a particular construction and illustrated the same in the drawing, I wish it to be understood that I do not wish to be limited to that particular construction, as it is obvious that numerous changes may be made within the scope of the invention as defined by the claim.

What is claimed is:—

The combination with a motorcycle, of means for steering the same, comprising pedals pivotally mounted to the foot boards of the machine, springs attached to said pedals and to said foot boards to normally hold the forward ends of the pedals spaced from the foot boards, a guide member secured to the forward bar of the frame of the machine and having outwardly inclined arms, pulleys on the ends of said arms, guards for said pulleys, a bar secured to the fork of the machine above the mud guard, ropes secured to the ends of said bar and to the forward ends of the pedals.

In testimony whereof, I affix my signature, in the presence of two witnesses.

JOHN HERMAN NORDIN.

Witnesses:
    JOHN C. JOHNSON,
    LORNTZ G. BARRY.

Copies of this patent may be obtained for five cents each, by addressing the "Commissioner of Patents, Washington, D. C."